(12) United States Patent
Leu et al.

(10) Patent No.: US 8,981,712 B2
(45) Date of Patent: Mar. 17, 2015

(54) CONVERTER AND SUBMODULE OF A CONVERTER FOR CHARGING OR DISCHARGING AN ENERGY STORE

(75) Inventors: Holger Leu, Uttenreuth (DE); Andreja Rasic, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 354 days.

(21) Appl. No.: 13/510,341

(22) PCT Filed: Nov. 19, 2009

(86) PCT No.: PCT/EP2009/065491
§ 371 (c)(1),
(2), (4) Date: May 17, 2012

(87) PCT Pub. No.: WO2011/060823
PCT Pub. Date: May 26, 2011

(65) Prior Publication Data
US 2012/0229080 A1 Sep. 13, 2012

(51) Int. Cl.
*H02M 7/219* (2006.01)
*H02M 7/483* (2007.01)

(52) U.S. Cl.
CPC .................................... *H02M 7/483* (2013.01)
USPC ....................................................... 320/107

(58) Field of Classification Search
CPC ............................................ H02M 7/219
USPC ........................................................ 320/107
See application file for complete search history.

(56) References Cited

U.S. PATENT DOCUMENTS

| 5,705,859 A | 1/1998 | Karg et al. |
| 6,198,257 B1 * | 3/2001 | Belehradek et al. ........... 323/222 |
| 2005/0099155 A1 | 5/2005 | Okuda et al. |
| 2008/0205093 A1 | 8/2008 | Davies et al. |
| 2009/0096425 A1 | 4/2009 | Barza et al. |

FOREIGN PATENT DOCUMENTS

| CN | 1703816 A | 11/2005 |
| CN | 2915591 Y | 6/2007 |
| CN | 101258670 A | 9/2008 |
| DE | 19913627 A1 | 10/2000 |
| DE | 10103031 A1 | 7/2002 |
| DE | 102007051052 A1 | 4/2009 |
| GB | 2294821 A | 5/1996 |

(Continued)

*Primary Examiner* — Thuan Do
(74) *Attorney, Agent, or Firm* — Laurence A. Greenberg; Werner H. Stemer; Ralph E. Locher

(57) ABSTRACT

A submodule charges or discharges an energy store and contains a capacitor unit and a power semiconductor circuit having power semiconductors that can be switched on and off. The capacitor unit and the power semiconductor circuit are connected to each other such that, after actuating the power semiconductors, the voltage released at the capacitor unit or a zero voltage can be produced at output terminals of the submodule. In order to provide a submodule allowing individual adaptation of the charging operation to the requirements of the energy store which, is cost-effective, the energy store is connected to the submodule via a DC-DC regulator. The regulator is connected to the capacitor unit and is configured to convert a capacitor voltage into a charge voltage that is required for charging the energy store, and to convert a discharge voltage released at the energy store during discharge into the capacitor voltage.

10 Claims, 1 Drawing Sheet

(56) References Cited

FOREIGN PATENT DOCUMENTS

| | | | |
|---|---|---|---|
| SU | 1758802 | A1 | 8/1992 |
| WO | 9618937 | A1 | 6/1996 |
| WO | 2007028349 | A1 | 3/2007 |
| WO | 2008081126 | A2 | 7/2008 |

* cited by examiner

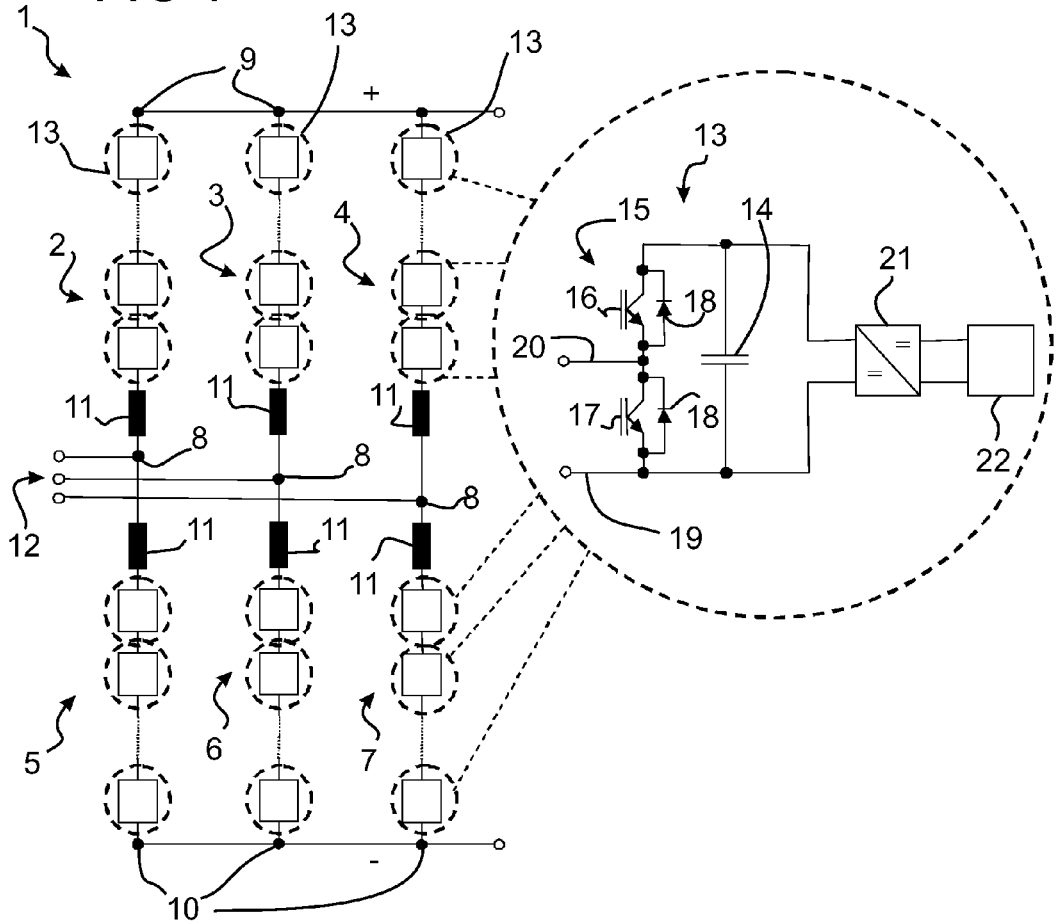
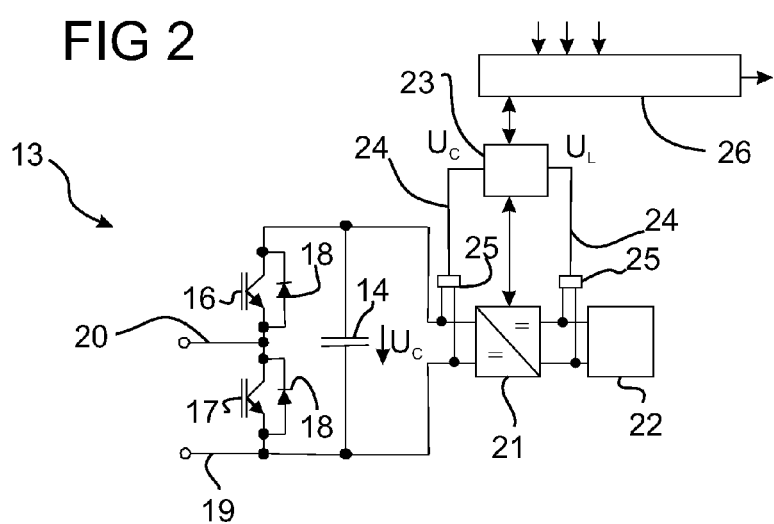

CONVERTER AND SUBMODULE OF A CONVERTER FOR CHARGING OR DISCHARGING AN ENERGY STORE

BACKGROUND OF THE INVENTION

Field of the Invention

The invention relates to a submodule for charging or discharging an energy store with a capacitor unit and a power semiconductor circuit, which has power semiconductors which can be switched on and off, the capacitor unit and the power semiconductor circuit being connected to one another in such a way that, depending on the driving of the power semiconductors in the power semiconductor circuit, at least the voltage drop across the capacitor or a zero voltage at output terminals of the submodule can be generated.

The invention furthermore relates to a converter with converter valves, which has a series circuit comprising such submodules.

Such a submodule and such a converter are already known from DE 101 030 31. The converter described therein has converter valves which form a bridge circuit. In this case, each converter valve extends between an AC voltage connection for connecting the converter to an AC voltage system and a DC voltage connection. Each valve has a series circuit comprising bipolar submodules, which each have a capacitor unit, which is connected in parallel with a power semiconductor circuit. The two connection terminals of each submodule are connected firstly to the capacitor unit and secondly to the potential point between the two power semiconductor switches, in parallel with which in each case one freewheeling diode is connected, in opposition. In this way, either a zero voltage or else the capacitor voltage drop across the capacitor unit can be generated at the two connection terminals of each submodule. In this way, a so-called multi-stage DC-voltage-impressing converter is provided.

DE 10 2007 051 052 describes a method for charging rechargeable lithium batteries. In this case, an AC voltage in the low-voltage range is connected to a switched mode power supply, which provides, on the output side, a DC voltage for charging a rechargeable battery.

A further charging apparatus for charging a rechargeable battery has been disclosed in DE 199 13 627 A1.

When charging a relatively large number of energy stores with electrical energy, a large number of problems result. Firstly, the electrical charging apparatus needs to be matched to the respective energy store to be charged. However, different energy stores generally require different charging voltages or charging currents. In particular in respect of a long life of the energy store, it is expedient to gear the charging or discharging operation as regards the charging parameters to the requirements of the respective energy store. Furthermore, the apparatus for charging or discharging the energy store should also be inexpensive.

BRIEF SUMMARY OF THE INVENTION

The object of the invention is therefore to provide a submodule and a converter of the type mentioned at the outset which make it possible for the charging operation to be matched individually to the requirements of the respective energy store and which are moreover inexpensive.

The invention achieves this object in that the energy store can be connected to the submodule via a DC-to-DC converter, the DC-to-DC converter being connected to the capacitor unit and being designed to convert a capacitor voltage drop across the capacitor into a charging voltage, which is required for charging the energy store, and to convert a discharging voltage drop across the energy store during discharge into the capacitor voltage.

Against the background of the converter mentioned at the outset, the invention achieves the object in that converter valves are provided which comprise at least partially a series circuit comprising such submodules.

According to the invention, at least one submodule of a modular multi-stage converter is used for charging external energy stores. In order to be able to select individually the required voltage during charging or discharging of the energy store, a so-called DC-to-DC converter is provided, which converts the voltage drop across the capacitor into the charging or discharging voltage respectively required. This has the advantage that the voltage drop across the capacitors of the submodules can largely be kept constant for all submodules. The matching to the respective energy store takes place via the DC-to-DC converter. The voltage drop across the capacitor unit of the submodule can be selected with the aid of the power semiconductors which can be switched off in the power semiconductor circuit in such a way that said voltage is approximately in the region of the charging or discharging voltages of the current energy store. The capacitor voltage for charging rechargeable batteries for electric cars is, for example, of the order of magnitude of approximately 10 V. The DC-to-DC converter therefore does not need to generate large voltage differences when converting the DC voltages, with the result that the demands placed on the DC-to-DC converter are low, as a result of which said converter is inexpensive. Furthermore, the losses of the DC-to-DC converter which arise during conversion of the DC voltage are also kept low.

Advantageously, the DC-to-DC converter is connected in parallel with a capacitor unit.

Expediently, a rechargeable battery is provided as energy store. Rechargeable batteries are chemical stores, in which electrical energy is converted into chemically bonded energy and stored in this form. Such rechargeable batteries are well known, and therefore it is not necessary to provide details of the configuration of said rechargeable batteries at this juncture. In principle, any desired rechargeable batteries can be used within the scope of the invention. Conventional rechargeable batteries are in this case lithium-ion rechargeable batteries or nickel-cadmium rechargeable batteries. It is of course also possible for lithium-air energy stores intended only for the future to be charged with the aid of the apparatus according to the invention or with the submodule according to the invention.

Advantageously, the power semiconductor circuit and the capacitor unit are connected to one another to form a full-bridge circuit, four power semiconductors which can be switched off being provided, with in each case one freewheeling diode being connected in parallel, in opposition, with said power semiconductors. Such full-bridge circuits are already used as converters or variable voltage sources in the sector of energy transmission and energy distribution. With the aid of the full-bridge circuit, it is possible to also generate the inverse capacitor voltage at the output terminals of each submodule, in addition to a zero voltage and the capacitor voltage.

As a deviation from this, power semiconductor circuits and capacitor unit form a half-bridge circuit, which has two power semiconductors which can be switched on and off, with in each case one freewheeling diode being connected in parallel, in opposition, with said power semiconductors. Furthermore, the submodule expediently has two connection terminals, with one connection terminal being connected to the capacitor unit and the other connection terminal being connected to the potential point between the two driveable power semiconductors. Instead of connecting a freewheeling diode in parallel, in opposition, with a power semiconductor, in the context of the invention it is also possible to use reverse-conducting power semiconductor switches.

Expediently, the DC-to-DC converter has a regulation unit, which is designed to have measuring sensors for detecting a charging or discharging voltage drop across the energy store and a capacitor voltage drop across the capacitor unit, the regulation unit being designed to adjust the charging or discharging voltage depending on at least one setpoint value. The determination of the setpoint value(s) can be input by a user, for example. As a deviation from this, it is also possible, however, to connect the regulation unit of the DC-to-DC converter to an energy store identification unit. The energy store identification unit reads, for example in a storage unit of the energy store, the respective type and the respectively required charging or discharging voltage and transmits this as setpoint value to the regulation unit of the DC-to-DC converter. Said DC-to-DC converter then sets, on the output side, the desired discharging or charging voltage, with the result that the charging or discharging of the energy store can be performed with the greatest degree of efficiency.

The DC-to-DC converter is a step-up converter or a step-down converter, for example.

It is furthermore expedient if the submodule is a bipolar submodule and has two connection terminals.

Further expedient configurations and advantages of the invention are the subject matter of the description below relating to exemplary embodiments of the invention with reference to the figures of the drawing, with identical reference symbols denoting functionally identical component parts, in which figures:

BRIEF DESCRIPTION OF THE SEVERAL VIEWS OF THE DRAWING

FIG. 1 shows an exemplary embodiment of the submodule according to the invention and the converter according to the invention, illustrated schematically, and FIG. 2 shows a submodule of a converter as shown in FIG. 1, in more detail.

DESCRIPTION OF THE INVENTION

FIG. 1 shows a schematic of a converter 1, which comprises a bridge circuit of power semiconductor valves 2, 3, 4, 5, 6 and 7, each of said power semiconductor valves extending between an AC voltage connection 8 and a positive DC voltage connection 9 or a negative DC voltage connection 10. Furthermore, each power semiconductor valve 2, 3, 4, 5, 6 and 7 has an inductor 11, which limits the current flow. FIG. 1 only indicates schematically that each AC voltage connection 8 of a converter is connected to the connection of an AC voltage system by a connecting means 12. This conventionally takes place via a transformer or else in DC-coupled fashion with the aid of inductors or coils, which are connected between the AC voltage connections 8 and the AC voltage system (not illustrated in FIG. 1).

It is furthermore shown in the figure that each of the power semiconductor valves 2, 3, 4, 5, 6 and 7 has a series circuit comprising bipolar submodules 13, which all have an identical design. Therefore, only one submodule 13 is illustrated in more detail in the right-hand half in FIG. 1. It can be seen from the figure that each submodule 13 has a capacitor unit 14 and a power semiconductor circuit 15, which extends in parallel with the capacitor unit 14. The power semiconductor circuit 15 has two power semiconductors 16 and 17, which can be switched both on and off. Such power semiconductors are, for example, so-called IGBTs, GTOs, X-FETs, IGCTs or the like. In principle, any power semiconductor which can be switched off can be used within the scope of the invention. A freewheeling diode 18 is connected in parallel, in opposition, with each of these driveable power semiconductors 16, 17. Furthermore, a first connection terminal 19 is DC-connected to the capacitor unit 14. A second connection terminal 20 is connected to the potential point between the power semiconductor 16 and 17. During operation of the converter 1, a capacitor voltage drop $U_C$ forms across the capacitor unit 14.

As has already been mentioned further above, each of the power semiconductors 16 or 17 can be transferred from an interrupter position, in which a current flow via the respective power semiconductor is interrupted, into its on position, in which a current flow via the power semiconductor in a forward direction is enabled, or vice versa. If the power semiconductors 16 and 17 are driven, for example, in such a way that the power semiconductor 17 is in its interrupter position, but the power semiconductor 16 is in its on position, the capacitor voltage drop $U_C$ across the output terminals 19 and 20 arises. If, however, the power semiconductor 17 is in its on position, the power semiconductor 16 is in its interrupter position, the voltage drop across the output terminals 19 and 20 is zero. Therefore, the capacitor voltage $U_C$ or a zero voltage can be applied to the output terminals 19 and 20.

Furthermore, it can be seen that the capacitor unit 14 is connected in parallel with a DC-to-DC converter 21. The DC-to-DC converter 21 is connected on the output side to an energy store 22, which is a lithium-ion rechargeable battery in the exemplary embodiment shown in FIG. 1.

The schematic illustration in FIG. 1 does not show that each power semiconductor 16, 17 is connected to a regulation and protection unit of the converter 1, with the aid of which the capacitor voltage drop across each capacitor unit can be set substantially.

FIG. 2 shows the submodule of a converter 1 shown in FIG. 1 in more detail. It can be seen that the DC-to-DC converter 21 has a regulation unit 23, which is connected via signal lines 24 to voltage sensors 25, which are designed firstly to detect the capacitor voltage $U_C$ and secondly to detect a charging or discharging voltage $U_L$. The DC-to-DC converter 21 is designed to convert the capacitor voltage $U_C$ into the charging voltage $U_L$ if the rechargeable battery 22 is intended to be charged. In the case of discharge of the rechargeable battery 22, the DC-to-DC converter 21 converts the discharging voltage $U_L$ into the capacitor voltage $U_C$, with the result that a power flow in both directions via the DC-to-DC converter 21 is made possible. The regulation unit of the DC-to-DC converter 21 is connected to a superordinate control unit, which can be referred to as a so-called "battery management system" 26, for example. The super ordinate battery management system 26 transmits, for example, desired setpoint values, such as charging currents or the like, to the regulation unit 23. Prior to and during a charging operation, the regulation unit 23 makes certain status parameters available to the battery management system 26, with which it is possible for the battery management system to dynamically calculate an optimum charging current.

As is indicated by the arrows in FIG. 2, the battery management system 26 can be connected to further control units in any desired manner.

The invention claimed is:

1. A submodule for charging or discharging an energy store, the submodule comprising:
   output terminals;
   a capacitor unit;
   a power semiconductor circuit having power semiconductors which can be switched on and off, said capacitor unit and said power semiconductor circuit connected to one another such that, depending on a driving of said power semiconductors in said power semiconductor circuit, at least a voltage drop across said capacitor unit and a zero voltage being generated selectively at said output terminals of the submodule;
   a DC-to-DC converter connected to said capacitor unit; and
   an energy store connected to said DC-to-DC converter, the DC-to-DC converter configured to convert a capacitor voltage drop across said capacitor unit into a charging voltage, required for charging said energy store, and to convert a discharging voltage drop across said energy store during discharge into the capacitor voltage.

2. The submodule according to claim 1, wherein said DC-to-DC converter is connected in parallel with said capacitor unit.

3. The submodule according to claim 2, wherein said energy store is a rechargeable battery.

4. The submodule according to claim 3, wherein said rechargeable battery is a chemical rechargeable battery.

5. The submodule according to claim 1,
   further comprising freewheeling diodes; and
   wherein four of said power semiconductors and said capacitor unit are connected to one another to form a full-bridge circuit, with in each case one of said freewheeling diodes being connected in parallel, in opposition, with each of said four power semiconductors.

6. The submodule according to claim 1,
   further comprising freewheeling diodes; and
   wherein said power semiconductor circuit and said capacitor unit form a half-bridge circuit, which has two of said power semiconductors which can be switched off, with in each case one of said freewheeling diodes being connected in parallel, in opposition, with each of said two power semiconductors.

7. The submodule according to claim 1, wherein said DC-to-DC converter has a regulation unit configured with measuring sensors for detecting the charging voltage or the discharging voltage drop across said energy store and the capacitor voltage drop across said capacitor unit, said regulation unit configured to adjust the charging voltage or the discharging voltage drop depending on at least one setpoint value.

8. The submodule according to claim 1, wherein said DC-to-DC converter is selected from the group consisting of a step-up converter and a step-down converter.

9. The submodule according to claim 1, further comprising two connection terminals.

10. A converter, comprising:
    converter valves having a series circuit containing submodules, each of said submodules containing:
       output terminals;
       a capacitor unit;
       a power semiconductor circuit having power semiconductors which can be switched on and off, said capacitor unit and said power semiconductor circuit connected to one another such that, depending on a driving of said power semiconductors in said power semiconductor circuit, at least a voltage drop across said capacitor unit and a zero voltage being generated selectively at said output terminals of the submodule;
       a DC-to-DC converter connected to said capacitor unit; and
       an energy store connected to said DC-to-DC converter, the DC-to-DC converter configured to convert a capacitor voltage drop across said capacitor unit into a charging voltage, required for charging said energy store, and to convert a discharging voltage drop across said energy store during discharge into the capacitor voltage drop.

* * * * *